July 24, 1934.  B. F. SCHMIDT  1,967,482
STEERING MECHANISM
Filed Oct. 22, 1929   4 Sheets-Sheet 1
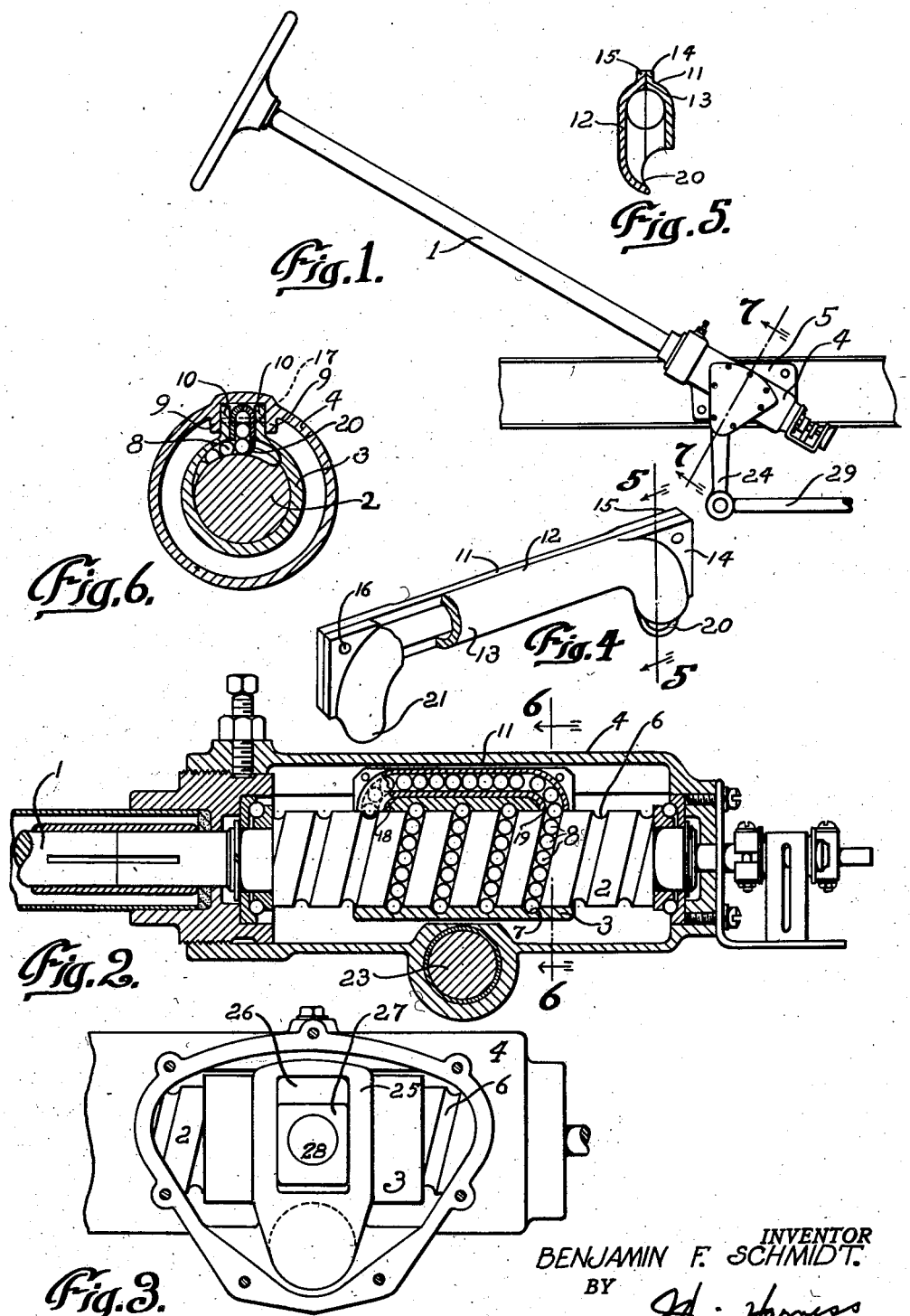
INVENTOR
BENJAMIN F. SCHMIDT.
BY
ATTORNEY July 24, 1934.  B. F. SCHMIDT  1,967,482
STEERING MECHANISM
Filed Oct. 22, 1929  4 Sheets-Sheet 2

INVENTOR
BENJAMIN F. SCHMIDT.
BY
Irving Harness
ATTORNEY

July 24, 1934.  B. F. SCHMIDT  1,967,482
STEERING MECHANISM
Filed Oct. 22, 1929  4 Sheets-Sheet 3
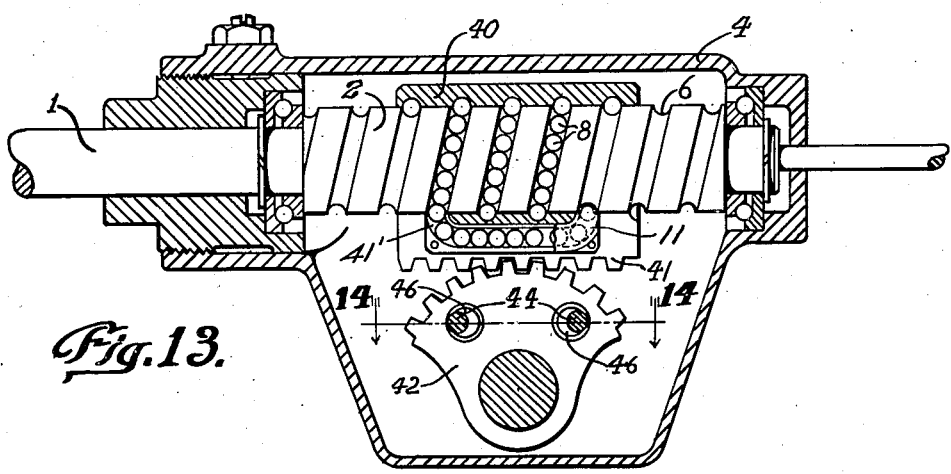
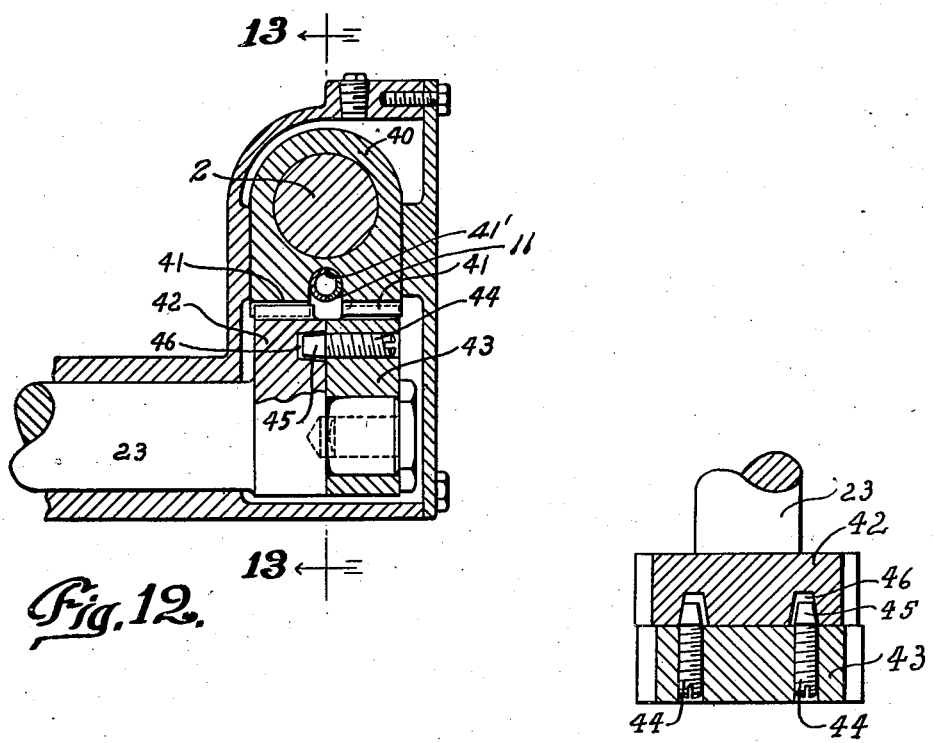
INVENTOR
BENJAMIN F. SCHMIDT.
BY
ATTORNEY

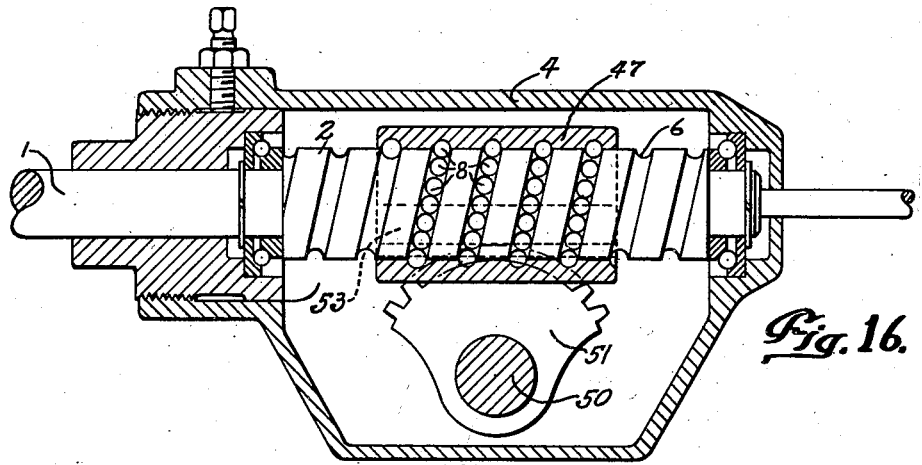
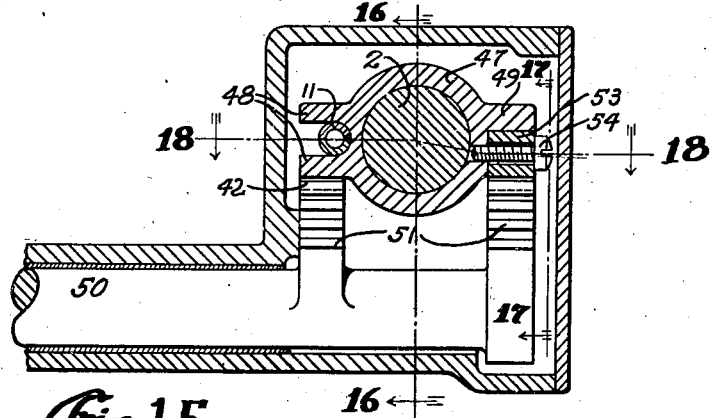
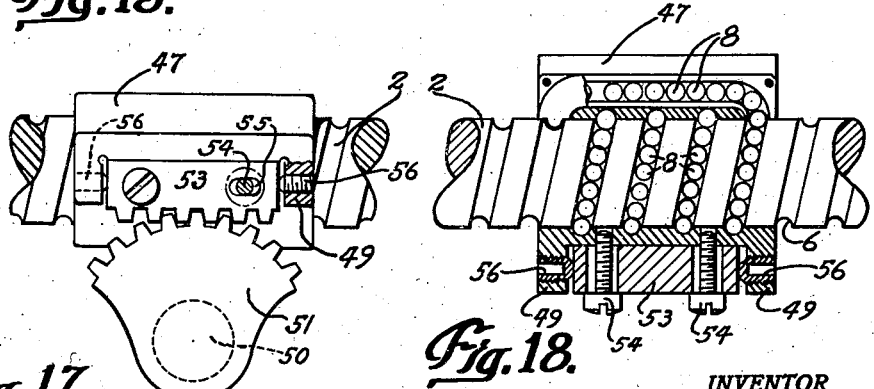
Fig. 16. Fig. 15. Fig. 17. Fig. 18.
INVENTOR
BENJAMIN F. SCHMIDT.
BY
ATTORNEY Patented July 24, 1934

1,967,482

UNITED STATES PATENT OFFICE 1,967,482

STEERING MECHANISM

Benjamin F. Schmidt, Los Angeles, Calif.

Application October 22, 1929, Serial No. 401,596

2 Claims. (Cl. 74—7)

This invention relates to steering mechanism for motor vehicles and particularly the steering gears of the type which employ a series of balls for transmitting movement from the steering worm to the worm nut and steering arm thereof.

The main objects of this invention are to provide an improved conveyor in a steering gear of this type for progressively transferring a series of balls from one end of a worm nut to the other; to provide a conveyor of this kind which may be conveniently assembled and installed in a steering gear housing for obviating the difficulty of machining a passage in the worm nut; to provide improved means for removing the balls from the steering worm at the respectively opposite ends of the worm nut so as to prevent resistance in feeding the balls into the conveyor; and to provide an improved driving connection between the worm nut and steering arm to avoid the use of gears and the occurence of lost motion with which they are generally accompanied.

A further object of this invention is to provide an improved means for taking up lost motion in a steering gear of the type which embodies a rack and pinion driving connection between the steering worm and the steering arm.

An illustrative embodiment of my invention is shown in the accompanying drawings, in which:

Fig. 1 is a side elevation of my improved steering gear.

Fig. 2 is a vertical section of a steering knuckle.

Fig. 3 is a side elevation of the steering knuckle showing the cover plate thereof removed to disclose underlying parts.

Fig. 4 is a detail perspective view of a ball conveyor.

Fig. 5 is a section taken on the line 5—5 of Fig. 4.

Fig. 6 is a section taken on the line 6—6 of Fig. 2.

Fig. 12 is a transverse section of a steering gear embodying another form of my invention.

Fig. 13 is a vertical section taken on line 13—13 of Fig. 12.

Fig. 14 is a horizontal section taken on line 14—14 of Fig. 13.

Fig. 15 is a transverse section of a steering gear illustrating another form of my invention.

Fig. 16 is a vertical section taken on line 16—16 of Fig. 15.

Fig. 17 is a vertical section taken on line 17—17 of Fig. 15.

Fig. 18 is a horizontal section taken on line 18—18 of Fig. 15.

Figure 7:
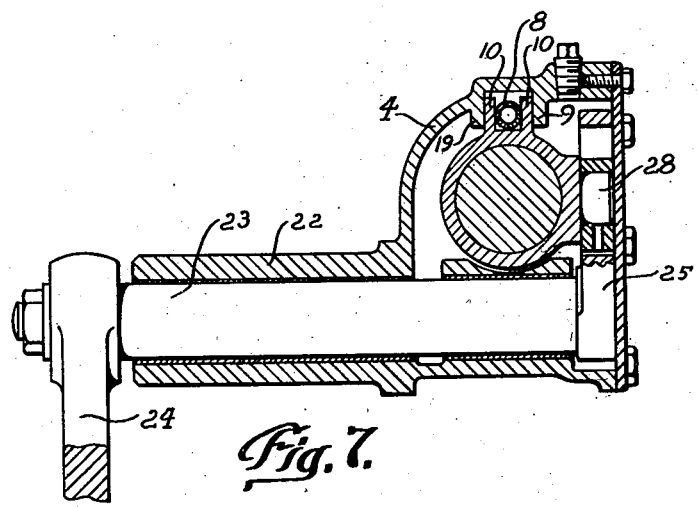
Fig. 7 is a transverse section taken on line 7—7 of Fig. 1.

In the illustration shown, the steering gear includes a steering column having a steering worm at one end, on which is mounted a worm nut. The worm and worm nut are enclosed within a housing and the worm nut is adapted for longitudinal movement relative to the housing. On the outer and inner peripheries of the worm and worm nut respectively, are helical grooves of corresponding pitch in which a series of balls is confined. A conveyor is provided on the nut for removing the balls from the groove of the worm at the respectively opposite ends of the worm nut and transferring them to the other end of the nut.

Mounted in the housing is a crank, having a steering arm at the one end and a crank arm at the other end which is operatively connected with the worm nut so as to oscillate the steering arm by the movement of the nut.

In the preferred forms of my invention shown in Figs. 1 to 7 inclusive, the steering gear includes a steering column 1, a worm 2 and a concentric worm nut 3. These parts are enclosed within the housing 4 which is mounted on the chassis frame of the vehicle by a bracket 5. The outer and inner peripheries of the worm 2 and nut 3 are provided with grooves 6 and 7 respectively, having corresponding pitch and containing a series of balls 8.

Formed on the inner periphery of the housing 4 is a pair of spaced flanges 9. The outer periphery of the nut 3 has a pair of spaced flanges 10 which are seated in the channel between the flanges 9. In this manner the nut 3 is secured against rotation relative to the worm 2 and the housing 4, but is slidable longitudinally of the steering worm and housing.

A ball conveyor 11 comprising conveniable, semi-cylindrical sections 12 and 13 is located in the channel between the flanges 10 of the nut. The sections of the conveyor comprise flanges 14 and 15, having registering apertures 16 that also register with apertures in flanges 10 of the nut which receive pins 17 for securing the conveyor in place. The end portions of the conveyor are arcuate in shape and extend into apertures 18 and 19 which communicate with the ends of the groove 7 of the worm nut. The semi-cylindrical section 12 of the conveyor has a lip 20 on its extremity which is seated in the groove 6 of the worm 2 and inclined forwardly as shown in Fig. 5. The section 13 has a rearwardly inclined lip 21 extending into the groove 6 of the worm at the opposite end of the tube.

Journaled in a bearing 22 of the housing 4 is a crank 23 which has a steering arm 24 at one end, and a crank arm 25 at the other end. The crank arm 25 has a slot 26 slidably supporting a cross-head block 27. Lug 28 extends from the side of the worm nut 3 and is journaled in an aperture of the cross-head block 27. A link 29 pivotally connects the control mechanism of a front wheel of the vehicle, not shown in the drawings, with the end of the steering arm 24.

In operation, clockwise rotation of the worm 2 causes the nut 3 to be shifted to the left and the balls 8 to be circulated through the conveyor 11 to the left as viewed in Fig. 2. Counterclockwise rotation of the worm 2 drives the nut 3 to the right as shown in Fig. 2 and causes the balls to be circulated through the conveyor 11 in the same direction. The reciprocation of the nut 3 causes the crank arm 25 and steering arm 4 to be oscillated.

The lips 20 and 21 provide inclined planes up which the balls may be fed to the conveyor with a minimum force. In this manner, the resistance heretofore encountered in manipulating the steering gear is materially reduced.

Figure 8:
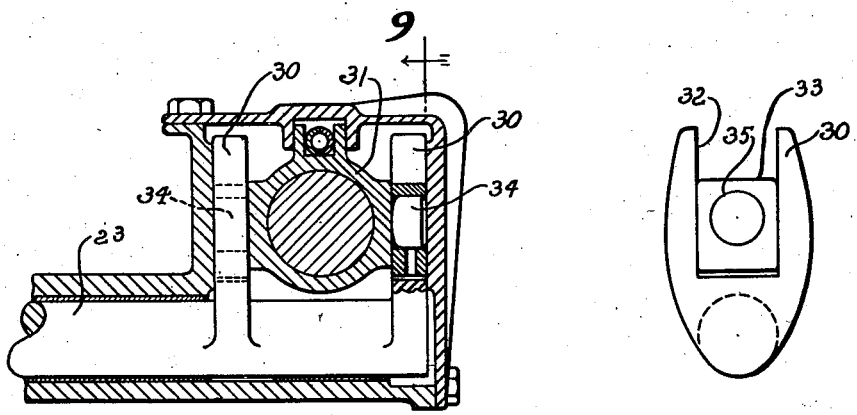
Fig. 8 is a transverse section, similar to Fig. 7, showing a further development of my invention.
Figure 9:
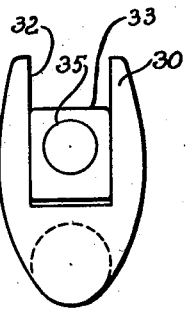
Fig. 9 is a vertical section taken on line 9—9 of Fig. 8.

In the form of my invention shown in Figs. 8 and 9, the crank 23 is provided with a pair of crank arms 30, one arm being located on each side of the worm nut 31. Each of the crank arms 30 has a slot 32 in which a cross-head block 33 is slidably mounted. Lugs 34 formed on the respectively opposite sides of the nut 31, are journaled in apertures 35 in the cross-head blocks 33. With this construction, the crank is oscillated by the two crank arms 30 thus adapting the device for use in heavy vehicles.

Figure 10:
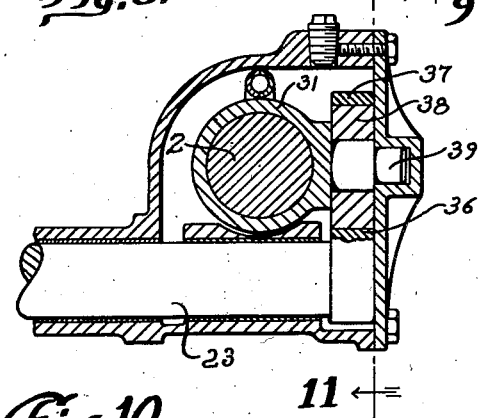
Fig. 10 is a fragmentary transverse section illustrating a further development of my invention.
Figure 11:
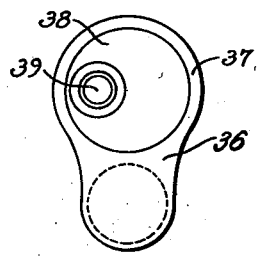
Fig. 11 is a vertical section taken on line 11—11 of Fig. 10.

In the form of my invention shown in Figs. 10 and 11, the crank 23 is provided with a crank arm 36 having a bearing 37 in which is journaled an eccentric member 38. A lug 39 of the worm nut 31 is journaled in an aperture of the member 38 at a point spaced from the center of the bearing. As the worm nut 31 is reciprocated relative to the worm 2, the eccentric member 38 is rotated, thereby oscillating the crank arm 25 and the steering arm 24.

The steering knuckle shown in Figs. 12, 13, and 14, includes a worm 2 a worm nut 40 and series of balls 8, by which the nut 40 is reciprocated in the above manner. The nut 40 is provided with a channel 41' in which is mounted, a ball conveyor 11 of the type shown in Fig. 4. On the lower side of the nut 40 is a rack comprising teeth 41. The crank 23 in this form of my invention has a pinion sector 42 rigidly secured on its inner end and pinion sector 43 adjustably mounted adjacent the fixed sector 42. The teeth of these sectors mesh with the teeth 41 of the nut 40 and the sectors are secured against relative movement by a pair of set screws 44 which have tapered extremities 45. The extremities 45 extend into tapered apertures 46 in the sector 42 and bear against the respectively opposite sides of the apertures. By adjusting the sector 43 relative to the sector 42, lost motion between teeth 41 of the rack and the teeth of the sectors may be eliminated. When nut 40 is reciprocated by rotation of the worm 2, the rack teeth 41 oscillate the sectors which in turn oscillate the crank and the steering arm.

In the form of my invention shown in Figs. 15 to 18 inclusive, a worm nut 47 is provided having a pair of flanges 48 on one side and a flange 49 on the opposite side. A ball conveyor 11 is seated between the flanges 48 of the nut and communicates with the groove 6 of the worm at the respectively opposite ends of the worm nut, in the manner described in connection with Figs. 1 to 6 inclusive. The crank 50 is provided with a pair of pinion sectors 51 which are located on respectively opposite sides of the nut 47. Formed on the lower flange 48 of the left hand side of the nut 47, are rack teeth 52 which mesh with the rack teeth of the left hand sector 51. A rack 53 is secured to the nut 47 by screws 54 and located in registration with the right hand sector 51 as viewed in Fig. 15. The screws 54 extend through elongated apertures 55 in the rack bar which permit adjustment of the rack bar to take up lost motion between the rack teeth and the teeth of the sectors when wear occurs. A pair of set screws 56, one at each end of the rack bar 53 is provided in the ends of the flange 49 for positively holding the rack bar in an adjusted position.

Although but one specific embodiment of this invention has herein been shown and described, it will be understood that the various changes including the size, shape and arrangement of parts, may be made without departing from the spirit of my invention and it is not my intention to limit its scope other than by the terms of the appended claims.

I claim:

1. A worm and nut-gearing unit including a housing, a worm in said housing having a helical groove in its periphery, a sleeve concentric with said worm having a helical groove in its inner periphery corresponding in pitch with the groove of said worm, said sleeve being provided with a pair of apertures, one communicating with each end of the groove of said sleeve, a pair of flanges on the outer periphery of said sleeve providing a channel having an open longitudinal side, a tube confined between the walls of said channel and fixed to said flanges, the ends of said tube being extended into said apertures, the wall of said housing being disposed adjacent said channel so as to close the open side thereof, a pair of lips, one on each end of said tube extending into the groove of said worm for removing balls therefrom and means on said channel adjacent the opposite sides of said flanges respectively for holding said nut against rotation relative to said housing.

2. A worm and nut gearing unit including a rotatable member, a worm member having a helical groove therein on said rotatable member, a worm housing enclosing said worm member and having spaced axially extending flanges on its inner periphery, a worm nut concentric with said worm member having spaced flanges slidably engaged between the flanges of said housing, said nut being provided with a helical groove registering with the groove of said worm member and having apertures at its extremities communicating with the ends of said groove and the passage between the flanges of said nut, a tubular member between the flanges of said nut having open ends disposed in said apertures, and a continuous series of balls in said tubular member and in the registering grooves of said nut and worm member.

BENJAMIN F. SCHMIDT.